US012049058B2

(12) United States Patent
Kiessner et al.

(10) Patent No.: US 12,049,058 B2
(45) Date of Patent: Jul. 30, 2024

(54) SYSTEMS AND METHODS FOR FORMING DUAL FLUTED CORRUGATED BOARD

(71) Applicant: Packsize LLC, Salt Lake City, UT (US)

(72) Inventors: Hanko Kiessner, Salt Lake City, UT (US); John Paul Alpine, Broomfield, CO (US)

(73) Assignee: PACKSIZE LLC, Salt Lake City, UT (US)

(*) Notice: Subject to any disclaimer, the term of this patent is extended or adjusted under 35 U.S.C. 154(b) by 0 days.

(21) Appl. No.: 17/474,869

(22) Filed: Sep. 14, 2021

(65) Prior Publication Data

US 2022/0080696 A1 Mar. 17, 2022

Related U.S. Application Data

(60) Provisional application No. 63/150,899, filed on Feb. 18, 2021, provisional application No. 63/079,350, filed on Sep. 16, 2020.

(51) Int. Cl.
*B31F 5/00* (2006.01)

(52) U.S. Cl.
CPC .................................. *B31F 5/008* (2013.01)

(58) Field of Classification Search
CPC ..................................................... B31F 5/008
USPC ....................................................... 493/379
See application file for complete search history.

(56) References Cited

U.S. PATENT DOCUMENTS

| | | | |
|---|---|---|---|
| 4,886,563 A | 12/1989 | Bennett et al. | |
| 5,114,509 A | 5/1992 | Johnston et al. | |
| 5,498,304 A | 3/1996 | Shaw et al. | |
| 5,894,681 A | 4/1999 | Klockenkemper et al. | |
| 6,153,037 A * | 11/2000 | Kim | B31F 1/2813 156/472 |
| 8,672,825 B2 | 3/2014 | Kohler | |
| 2004/0234728 A1 | 11/2004 | Suksi et al. | |
| 2005/0016690 A1* | 1/2005 | Gmeiner | B29C 66/438 156/73.1 |
| 2011/0064926 A1 | 3/2011 | Babinsky et al. | |
| 2014/0137977 A1* | 5/2014 | Cik | B23K 20/10 219/121.64 |
| 2018/0073861 A1* | 3/2018 | Ruhland | B31F 1/2836 |

OTHER PUBLICATIONS

International Search Report and Written Opinion received for PCT Patent Application No. PCT/US21/50397, mailed on Feb. 4, 2022, 21 pages.

Invitation to Pay Additional Fees received for PCT Patent Application No. PCT/US21/50397, mailed on Nov. 24, 2021, 3 pages.

* cited by examiner

*Primary Examiner* — Anne Marie Antonucci
*Assistant Examiner* — Luis G Del Valle
(74) *Attorney, Agent, or Firm* — Quarles & Brady LLP

(57) ABSTRACT

A method for making a dual fluted corrugated board includes providing a first single face corrugated board having a liner layer and a fluted layer attached to the liner layer and providing a second single face corrugated board having a liner layer and a fluted layer attached to the liner layer. The method also includes arranging the first single face corrugated board and the second single face corrugated board such that the fluted layers thereof face one another and attaching the first single face corrugated board to the second single face corrugated board.

16 Claims, 5 Drawing Sheets

SYSTEMS AND METHODS FOR FORMING DUAL FLUTED CORRUGATED BOARD

CROSS-REFERENCE TO RELATED APPLICATIONS

This application claims priority to and the benefit of U.S. Patent Application Ser. No. 63/150,899, filed Feb. 18, 2021, and entitled Systems and Methods for Forming Dual Fluted Corrugated Board with Ultrasound, and U.S. Patent Application Ser. No. 63/079,350, filed Sep. 16, 2020, and entitled Systems and Methods for Forming Dual Fluted Corrugated Board, the disclosures of which are incorporated herein by this reference in their entireties.

TECHNICAL FIELD

Exemplary embodiments of the disclosure relate to systems, methods, and devices for forming corrugated board. More specifically, exemplary embodiments relate to systems, methods, and devices for forming dual fluted board from two single face corrugated boards.

BRIEF SUMMARY

Exemplary embodiments of the disclosure relate to systems, methods, and devices for forming corrugated board. More specifically, exemplary embodiments relate to systems, methods, and devices for forming dual fluted corrugated board from two single face corrugated boards. In some embodiments, the two single face corrugated boards are joined together using ultrasound.

For instance, one embodiment is directed to a method for making a dual fluted corrugated board. The method includes providing a first single face corrugated board having a liner layer and a fluted layer attached to the liner layer and providing a second single face corrugated board having a liner layer and a fluted layer attached to the liner layer. The first single face corrugated board and the second single face corrugated board are arranged such that the fluted layers thereof face one another. The first single face corrugated board is attached to the second single face corrugated board. In some embodiments, the first and second single face corrugated boards are attached together using an adhesive. In some embodiments, the adhesive is activated, heated, and/or dried using ultrasound. The ultrasonic vibrations may be configured to remove moisture from the single face corrugate boards, activate, heat, and/or dry the adhesive, and/or cause the paper fibers of the single face corrugated boards to weave, intertwine, or otherwise stick together to achieve the bonding.

According to another embodiment, a system for producing dual fluted corrugated boards includes a first supply of single face corrugated board having a liner layer and a fluted layer attached to the liner layer and a second supply of single face corrugated board having a liner layer and a fluted layer attached to the liner layer. Each of the fluted layers has a plurality of peaks and valleys. The system also includes an adhesive applicator configured to apply an adhesive to the fluted layer of the first supply and/or the fluted layer of the second supply. First and second merger guides are configured to guide the single face corrugated boards of the first and second supplies, respectively, into engagement with one another such that the peaks of the first supply nest within the valleys of the second supply and the peaks of the second supply nest within the valleys of the first supply. A sensor can detect proper engagement and nesting of the single face corrugated boards of the first and second supplies with one another. An ultrasonic device can activate, heat, and/or dry the adhesive and/or cause the fibers of the first and second single face corrugated boards to weave, intertwine, or otherwise stick or bond together.

In still another embodiment, a method for making a dual fluted corrugated board includes providing a first single face corrugated board having a liner layer and a fluted layer attached to the liner layer and providing a second single face corrugated board having a liner layer and a fluted layer attached to the liner layer. Each of the fluted layers includes a plurality of peaks and valleys facing one another. Adhesive is applied to the fluted layer of the first single face corrugated board and/or to the fluted layer of the second single face corrugated board. The fluted layer of the first single face corrugated board is aligned with the fluted layer of the second single face corrugated board such that (i) the peaks in the fluted layer of the first single face corrugated board are aligned with the valleys in the fluted layer of the second single face corrugated board, and (ii) the valleys in the fluted layer of the first single face corrugated board are aligned with the peaks in the fluted layer of the second single face corrugated board. The first single face corrugated board and the second single face corrugated board are pressed together such that the fluted layers thereof are nested together. Ultrasound is used to activate, heat, and/or dry the adhesive and/or cause the fibers of the first and second single face corrugated board to weave or intertwine to securely bond the first and second single face corrugated boards together.

These and other objects and features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

While the present disclosure will describe details of embodiments with reference to specific configurations, the descriptions are illustrative and are not to be construed as limiting the scope of the present invention. Various modifications can be made to the illustrated configurations without departing from the spirit and scope of the invention as defined by the claims. For better understanding, like components have been designated by like reference numbers throughout the various accompanying figures.

Figure 1A:
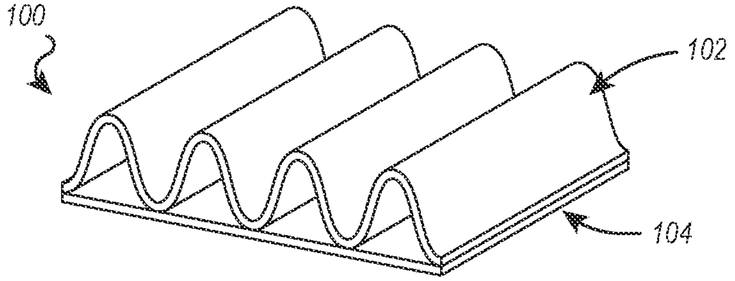
FIG. 1A illustrates a single face corrugated board.

Shipping and packaging industries frequently use corrugate board to create boxes and other packaging materials, including protective inserts that are placed inside of boxes to further protect items packaged therein. As shown in FIGS. 1A-1D, there are various of types of corrugated boards. The most basic type of corrugated board is referred to as a single face board. As shown in FIG. 1A, a single face board 100 has only two layers, a corrugated or fluted layer 102 and a liner layer 104. Single face boards are not as durable as the other types of corrugated boards. As a result, single face boards are often used inside of boxes to add extra cushioning or protection to items packaged therein.

Figure 1B:
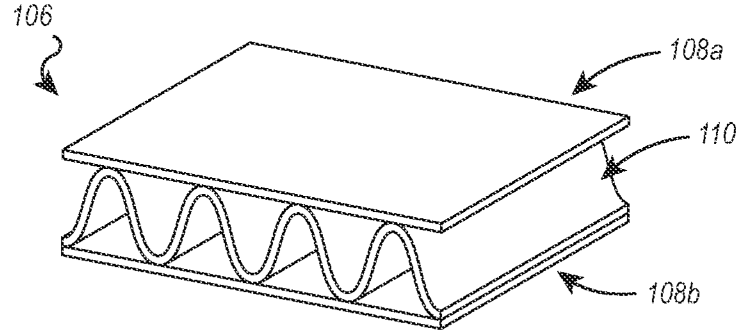
FIG. 1B illustrates a single wall corrugated board.

FIG. 1B shows a more common type of corrugated board, which is referred to as a single wall board 106. A single wall board 106 includes two outer liners 108*a*, 108*b* and a middle corrugated or fluted layer 110 attached to the outer liners 108*a*, 108*b*. A single wall board provides far superior strength and rigidity compared to single face boards. As a result, single wall boards are commonly used to form shipping boxes.

Figure 1C:
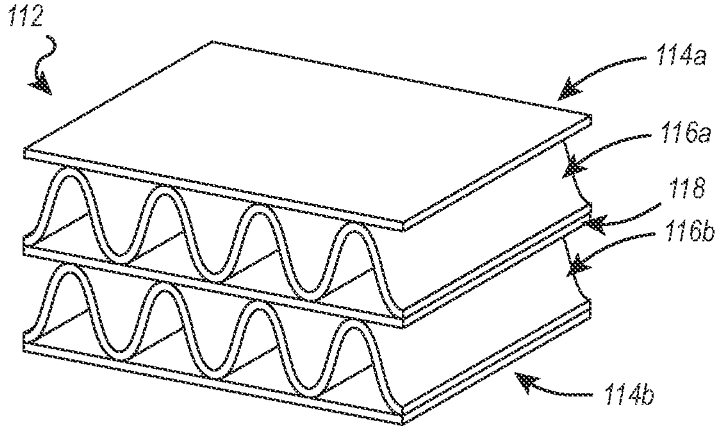
FIG. 1C illustrates a double wall corrugated board.

FIG. 1C shows a double wall board 112. Double wall board 112 includes two outer liners 114*a*, 114*b*, two corrugated or fluted layers 116*a*, 116*b*, and a middle liner 118. As can be seen in FIG. 1C, the fluted layer 116*a* is positioned between and attached to the outer liner 114*a* and the middle liner 118 and the fluted layer 116*b* is position between and attached to the outer liner 114*b* and the middle liner 118. The middle liner 118 also separates the fluted layers 116*a*, 116*b* from each other. The multi-layered nature of the double wall board 112 makes it highly rigid and durable. As a result, double wall boards are often used to form industrial strength cartons.

Figure 1D:
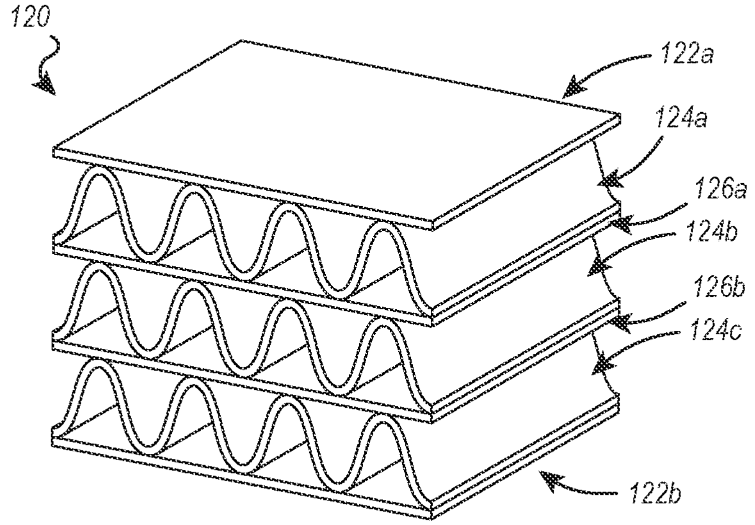
FIG. 1D illustrates a triple wall corrugated board.

FIG. 1D shows a triple wall board 120. Triple wall board 120 includes two outer liners 122*a*, 122*b*, three corrugated or fluted layers 124*a*, 124*b*, 124*c*, and two middle liners 126*a*, 126*b*. As can be seen in FIG. 1D, the fluted layer 124*a* is positioned between and attached to the outer liner 122*a* and the middle liner 126*a*, the fluted layer 124*b* is positioned between and attached to the middle liner 126*a* and the middle liner 126*b*, and the fluted layer 124*c* is position between and attached to the outer liner 122*b* and the middle liner 126*b*. The middle liner 126*a* separates the fluted layers 124*a*, 124*b* from each other and the middle liner 126*b* separates the fluted layers 124*b*, 124*c* from each other. The multi-layered nature of the triple wall board 120 makes it highly rigid and durable. As a result, triple wall boards are often used in place of wood to create shipping crates.

Figure 2:
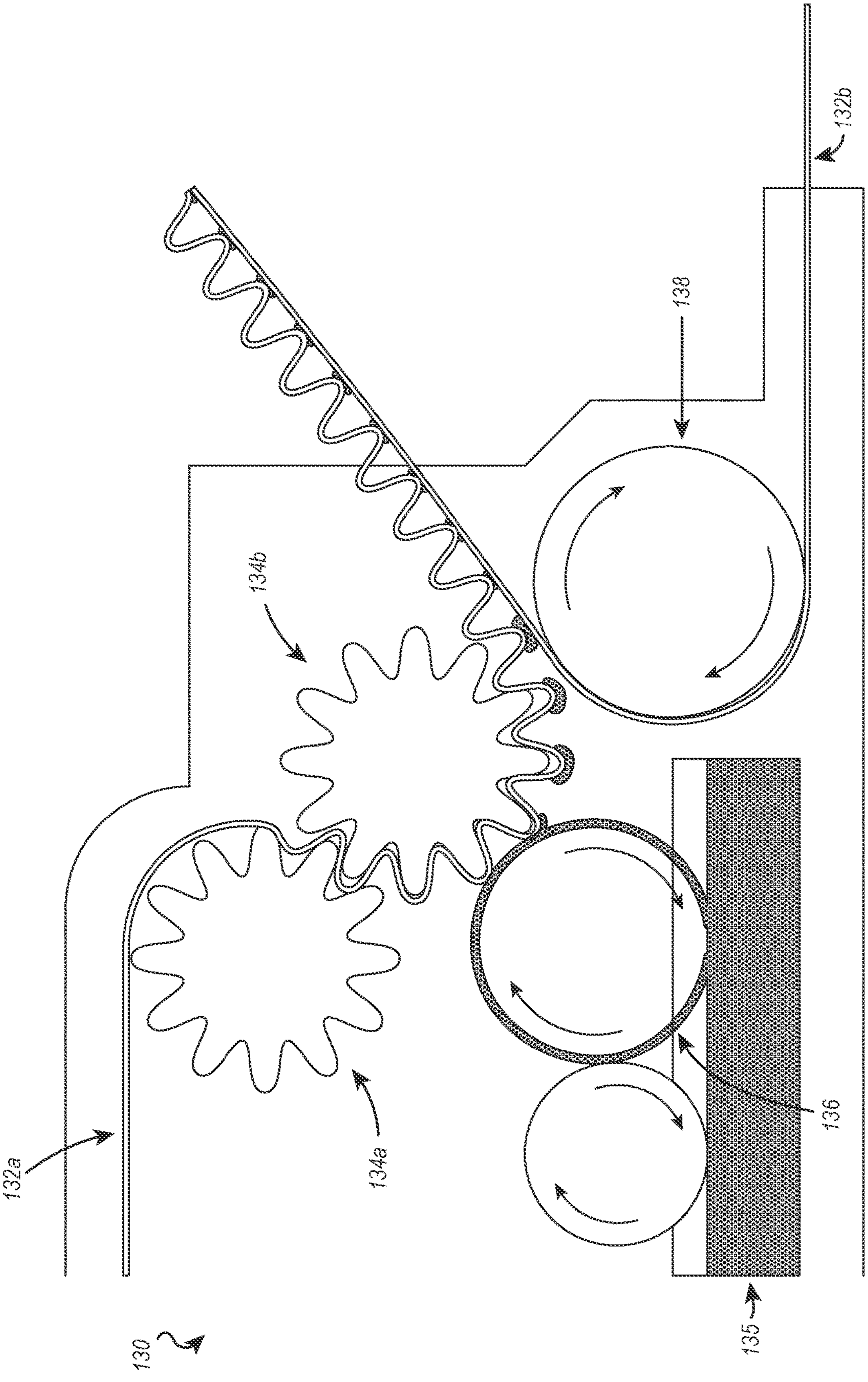
FIG. 2 illustrates an example system for forming single face corrugated boards.

FIG. 2 illustrates one example embodiment of a system 130 that can be employed to form single face boards, such as single face board 100 from FIG. 1A. As can be seen in FIG. 2, system 130 includes first and second streams of sheet material 132*a*, 132*b*. Sheet material 132*a* will become the fluted layer (e.g., fluted layer 102, FIG. 1A) and sheet material 132*b* will become the liner layer (e.g., liner layer 104, FIG. 1A) of the single face board.

Sheet material 132*a* is fed partially around/through fluting rollers 134*a*, 134*b* to fold sheet material 132*a* into the fluted configuration shown. More specifically, the fluting rollers 134*a*, 134*b* include alternating and nesting/mating peaks and valleys formed on the exterior surfaces thereof. As the fluting rollers 134*a*, 134*b* rotate, sheet material 132*a* is compressed between the nesting/mating peaks and valleys, thereby folding sheet material 132*a* into the fluted configuration.

As sheet material 132*a* rotates about fluting roller 134*b*, a liquid (e.g., water), glue, or another adhesive (water, glue, and adhesive may be generally referred to herein as an adhesive) is applied thereto. In the illustrated embodiment, a glue wheel 136 rotates through a reservoir 135 of water, glue, or another adhesive. As the glue wheel 136 rotates, it picks up water, glue, or another adhesive from reservoir 135. With further rotation of the glue wheel 136, the water, glue, or another adhesive thereon is brought into contact with the peaks on one side of the fluted sheet material 132*a* and is transferred thereto.

With the water, glue, or another adhesive applied thereto and further rotation of fluting roller 134*b*, the fluted sheet material 132*a* is brought into contact with the sheet material 132*b*. A pressure roller 138 and the peaks of the fluted roller 134*b* apply pressure between the peaks of the fluted sheet material 132*a* and the sheet material 132*b* with the water, glue, or adhesive therebetween to help bond the sheet materials 132*a*, 132*b* together.

It will be appreciated that the system and process shown and described in connection with FIG. 2 for forming single face corrugate boards is merely exemplary. Other systems, processes, and devices for forming single face corrugate boards may be used in connection with the disclosed embodiments.

Figure 3A:
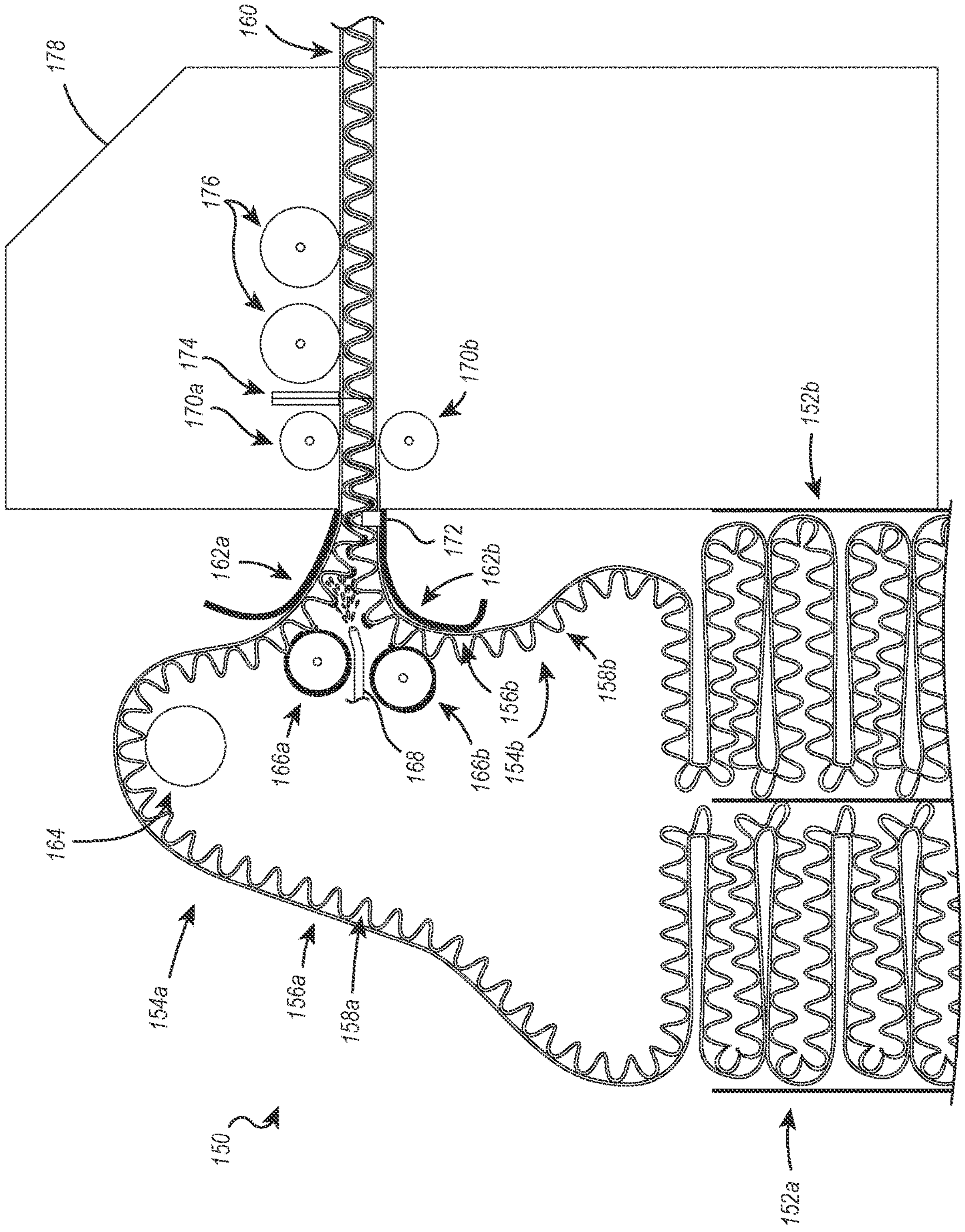
FIG. 3A illustrates an example system for forming dual fluted corrugated boards.

Attention is now directed to FIG. 3A, which illustrates a system 150 for making dual fluted corrugated boards and boxes therefrom. As can be seen, system 150 includes first and second supplies 152*a*, 152*b* of single face corrugate boards 154*a*, 154*b*. The single face corrugate board 154*a* includes a liner 156*a* and a fluted layer 158*a* and the single face corrugate board 154*b* includes a liner 156*b* and a fluted layer 158*b*.

The supplies 152*a*, 152*b* may be premanufactured and folded into fanfold bales or rolled into cylindrical bales, as shown in FIG. 3A. The premanufactured supplies 152*a*, 152*b* may be positioned and used in system 150 to form dual fluted corrugate boards, as described below. Alternatively, the supplies 152*a*, 152*b* may not be premanufactured. Rather, the supplies 152*a*, 152*b* may include first and second systems similar to system 130 from FIG. 2. Such systems may produce single face corrugate boards 154*a*, 154*b* on demand or as needed by system 150.

Whether the single face corrugate boards 154*a*, 154*b* are premanufactured or made on demand, system 150 can use the single face corrugate boards 154*a*, 154*b* to form a dual fluted corrugate board 160. The dual fluted corrugate board 160 includes opposing outer layers formed from liners 156*a*, 156*b* from the single face corrugate boards 154*a*, 154*b*. The dual fluted corrugate board 160 also includes a dual fluted layer formed from fluted layers 158*a*, 158*b* from the single face corrugate boards 154*a*, 154*b*. As will be described in more detail below, the fluted layers 158*a*, 158*b* are glued or otherwise attached to one another. Attaching the fluted layers 158*a*, 158*b* together attaches the single face corrugate boards 154*a*. 154*b* together and forms a corrugated board with opposing outer layers and an inner fluted layer that is two layers thick.

As can be seen in FIG. 3A, the single face corrugate boards 154*a*. 154*b* are spaced apart from one another and fed along merging guides 162*a*. 162*b*. A feed wheel 164 may guide/advance the single face corrugate board 154*a* towards the merging guide 162*a*. The feed wheel 164 may also maintain a desired space or separation between the single face corrugate boards 154*a*, 154*b* during an initial phase of the process.

As the single face corrugate boards 154*a*, 154*b* advance along the merging guides 162*a*, 162*b*, water, glue, or another adhesive may be applied to one or both of the fluted layers 158*a*, 158*b*. For instance, as shown in FIG. 3A, glue wheels 166*a*, 166*b* may apply water, glue, or another adhesive to the peaks of the fluted layers 158*a*, 158*b* that face one another. Alternatively, or additionally, as shown in FIG. 3A, one or more nozzles 168 may spray water, glue, or another adhesive onto one or both of the surfaces of the fluted layers 158*a*, 158*b* that face one another. In some embodiments, the one or more nozzles 168 may apply water, glue, or another adhesive to substantially the entire surfaces of the fluted layers 158*a*, 158*b* that face one another. In other embodiments, the one or more nozzles 168 may apply water, glue, or another adhesive to only portions of the surfaces of the fluted layers 158*a*, 158*b* that face one another. For instance, the one or more nozzles 168 may only apply water, glue, or another adhesive to the peaks of the fluted layers 158*a*, 158*b* that face one another.

Once water, glue, or another adhesive has been applied to the fluted layers 158*a*, 158*b*, the merging guides 162*a*, 162*b* may guide the single face corrugate boards 154*a*, 154*b* together. More specifically, the distance between the merging guides 162*a*, 162*b* may decreases so as to bring the single face corrugate boards 154*a*, 154*b* closer together and ultimately into contact with one another. The single face corrugate boards 154*a*, 154*b* may be brought into contact with one another such that the fluted layers 158*a*, 158*b* nest or mate within each other. That is, for example, the peaks on the fluted layer 158*a* may nest or mate within the valleys in the fluted layer 158*b* and the peaks on the fluted layer 158*b* may nest or mate within the valleys in the fluted layer 158*a*.

The system 150 also include feed wheels 170*a*, 170*b*. The feed wheels 170*a*, 170*b* may assist with advancing the single face corrugate boards 154*a*, 154*b*/dual fluted corrugate board 160. As noted below, the feed wheels 170*a*, 170*b* may advance the single face corrugate boards 154*a*, 154*b* at different rates and/or at the same rate. Additionally, in some embodiments, the feed wheels 170*a*, 170*b* may also press the single face corrugate boards 154*a*, 154*b* together to facilitate a strong attachment between the fluted layers 158*a*, 158*b* and the water, glue, or another adhesive applied thereto.

As noted above, the merging guides 162*a*, 162*b* bring the single face corrugate boards 154*a*, 154*b* closer together and into contact with one another. It is important to ensure that the single face corrugate boards 154*a*, 154*b* are properly aligned when they are brought together. In particular, it is important to ensure that the fluted layers 158*a*, 158*b* are aligned with one another in mating or nesting fashion (e.g., so the peaks of one fluted layer will nest in the valleys of the other fluted layer). If the fluted layers 158*a*, 158*b* are not properly aligned with one another, the fluting layers 158*a*, 158*b* may not properly attach to each other. Additionally, the peaks of the fluting layers 158*a*, 158*b* may compress against one another, thereby deforming the peaks and reducing the strength of the dual fluted corrugate board 160.

To monitor whether the fluted layers 158*a*, 158*b* are properly aligned with one another and ensure that the peaks and valleys thereof are properly nesting together, the system 150 may include a sensor 172, such as a photoelectric sensor or photo eye. The sensor 172 may be positioned along the side of the single face corrugate boards 154*a*, 154*b*/dual fluted corrugate board 160. The sensor 172 may be positioned to "see" through the nested peaks and valleys of the combined fluted layers 158*a*, 158*b*. However, if the fluted layers 158*a*, 158*b* are not aligned and properly nesting, the fluted layers 158*a*, 158*b* may become deformed. The deformed fluted layers 158*a*, 158*b* may block the vision of the sensor 172, thereby indicating that the fluted layers 158*a*, 158*b* are misaligned.

When the fluted layers 158*a*, 158*b* are misaligned, the rotational speed of one or both of the feed wheels 170*a*, 170*b* may be adjusted. For instance, the speed of feed wheel 170*a* may be (at least temporarily) increased to advance the single face corrugate board 154*a* faster than the single face corrugate board 154*b*. By at least temporarily advancing the single face corrugate board 154*a* faster than the single face corrugate board 154*b*, the fluted layers 158*a*, 158*b* may be aligned with one another. Once the fluted layers 158*a*, 158*b* are aligned with one another, the peaks and valleys thereof will properly nest or mate together. When the peaks and valleys properly nest together, the sensor 172 will be able to "see" through the combined peaks and valleys and the speeds of the feed wheels 170*a*, 170*b* may be synchronized.

Once formed, the dual fluted corrugate board 160 may be converted into a box template. For instance, as shown in FIG. 3A, one or more crossheads 174 and/or one or more longheads 176 may perform one or more conversion functions on the dual fluted corrugate board 160 to form a box template therefrom. The conversion functions may include cuts, creases, scores, folds, bend, and the like. The box template may then be erected into a box. The one or more crossheads 174 and/or one or more longheads 176 may be part of a box making machine 178.

As is well known in the art, fanfold or z-fold corrugate material is often used by box making machines to form box templates therefrom, and particularly box making machines that form custom sized box templates. Fanfold or z-fold corrugate material is corrugate material that has been folded back and forth on itself to form a stack or bale of corrugate material. Such stacks or bales of corrugate material allow for the corrugate to be stored and transported (e.g., on pallets) in an efficient manner. However, there are some potential drawbacks to fanfold or z-fold corrugate material. For instance, the folds or creases formed in the corrugate material when making the stacks or bales remain in the corrugate material even after the corrugate material is unfolded or removed from the stack or bale. The folds or creases can pose challenges for processing the corrugate material, including feeding the corrugate material through box making machines, etc. Additionally, the folds or creases can also be undesirable in a finished box. For instance, if the folds or creases are located in certain areas of a finished box, the box may have slightly less strength or may be visually less appealing.

Using the disclosed corrugate making systems in conjunction with a box making machine can avoid the potential drawbacks associated with fanfold or z-fold corrugate material. That is, the corrugate making systems disclosed herein may be associated with a box making machine such that the newly formed corrugate material can be fed into the box making machine without having the corrugate material first formed into a fanfold or z-fold bale. Feeding the newly formed corrugate material (that does not have fanfold or z-fold creases) directly into a box making machine reduces the challenges of processing the corrugate material (e.g., by the box making machine, etc.) and allows for boxes to be formed that are free of the fanfold or z-fold creases.

Nevertheless, the corrugate making systems disclosed herein are not required to be used directly with a box making machine. Rather, for instance, the disclosed corrugate making systems may be associated with a fanfold system that is configured to fold the newly formed corrugate into a fanfold or z-fold stack or bale.

Attention is now directed to Figured 3B, which illustrates a system 150' for making dual fluted corrugated boards and boxes therefrom. In many respects, the system 150' is similar or identical to the system 150 from FIG. 3A. Accordingly, the discussion of the system 150' will focus on those aspects that are particularly unique compared to the system 150.

The system 150' includes one or more ultrasonic devices 180. In the illustrated embodiment, the ultrasonic device 180 is positioned between the sensor 172 and the feed wheels 170*a*, 170*b*. However, the ultrasonic device 180 may be positioned at other locations within the system 150'. For instance, the ultrasonic device 180 may be positioned between the feed wheels 170*a*, 170*b* and the crosshead 174.

The ultrasonic device 180 may be used to facilitate bonding of the single face corrugate boards 154*a*, 154*b*. For instance, as the single face corrugate boards 154*a*, 154*b* pass by or through the ultrasonic device 180, the ultrasonic device 180 may activate the water, glue, or other adhesive that was previously applied to the fluted layers 158*a*, 158*b*. In some embodiments, the water, glue, or other adhesive affects the fibers of the single face corrugate boards 158*a*, 158*b* in a way that facilitates bonding between the fibers and, thus, the single face corrugate boards 158*a*, 158*b*. For instance, the water, glue, or other adhesive may soften an outer fiber layer from the fibers of the single face corrugate board 158*a*, 158*b* or/or cause the fibers to loosen from one another. As the water, glue, or other adhesive dries, sets, or cures, the fibers of the single face corrugate boards 158*a*, 158*b* that are contacting one another may weave, intertwine, or otherwise stick together to bond the single face corrugate boards 158*a*, 158*b* together.

With the water, glue, or other adhesive activated, the ultrasonic device 180 and/or the feed wheels 170*a*, 170*b* may presses the single face corrugate boards 154*a*, 154*b* together (with the activated water, glue, or other adhesive therebetween) and the activated water, glue, or other adhesive may bond the single face corrugate boards 154*a*, 154*b* together.

In some embodiments, activating the water, glue, or other adhesive may include heating the water, glue, or other adhesive. The ultrasonic device 180 may produce ultrasonic vibrations (and optionally pressure) that heat the water, glue, or other adhesive enough to enable the water, glue, or other adhesive to bond with another surface. In such embodiments, the ultrasonic device 180 is likely to be positioned upstream of the feed wheels 170*a*, 170*b*, such that the ultrasonic device 180 is able to activate the water, glue, or other adhesive before the feed wheels 170*b*, 170*b* press the single face corrugate boards 154*a*, 154*b* together.

In other embodiments, the ultrasonic device 180 may be used to dry or cure the previously applied water, glue, or another adhesive. For instance, if water is previously applied to the corrugate boards 154*a*, 154*b*, the ultrasonic device 180 may produce ultrasonic vibrations (and optionally pressure) that cause the corrugate boards 154*a*, 154*b* to release the water or moisture therefrom. In embodiments where glue or another adhesive has previously been applied to the corrugate boards 154*a*, 154*b*, the ultrasonic device 180 may produce ultrasonic vibrations (and optionally pressure) that cause the glue or other adhesive to release moisture, thereby facilitating drying or curing of the glue or other adhesive. In such embodiments, the ultrasonic device 180 is likely to be positioned downstream of the feed wheels 170*a*, 170*b*, such that the ultrasonic device 180 is able to dry or cure the water, glue, or other adhesive after the feed wheels 170*b*, 170*b* press the single face corrugate boards 154*a*, 154*b* together.

It will be appreciated that embodiments may include a first ultrasonic device 180 that is used to activate the water, glue, or other adhesive and a second ultrasonic device 180 that is used to dry or cure the water, glue, or other adhesive. In such embodiments, the first ultrasonic device 180 may be positioned upstream of the feed wheels 170*a*, 170*b* and the second ultrasonic device 180 may be positioned downstream of the feed wheels 170*a*, 170*b*.

In still other embodiments, the ultrasonic device 180 may be used to bond the first and second single face corrugated boards 154*a*, 154*b* together without using glue or another adhesive. For instance, the ultrasonic device 180 or another device may press the first and second single face corrugated boards 154*a*, 154*b* together and the ultrasonic device 180 may produce ultrasonic vibrations that cause the materials of the first and second single face corrugated boards 154*a*, 154*b* to bond together.

Figure 4:
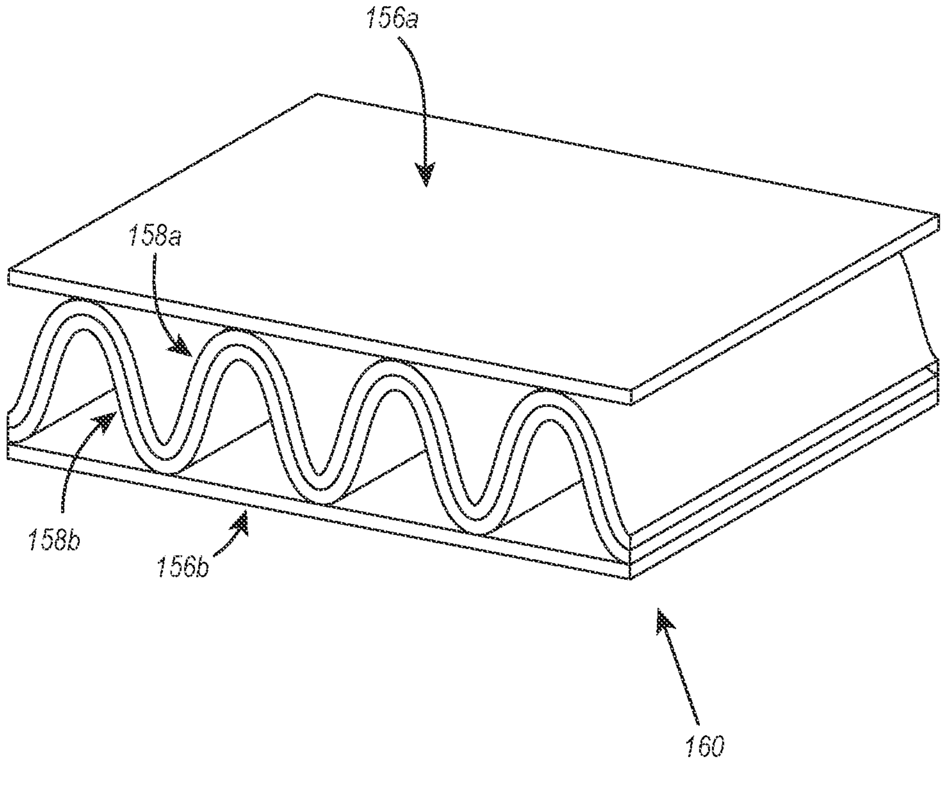
FIG. 4 illustrates an example embodiment of a dual fluted corrugated board.

FIG. 4 illustrates a perspective view of the dual fluted corrugated board 160 created with either of the systems 150, 150'. As can be seen, the dual fluted corrugated board 160 includes first and second liners 156*a*, 156*b* on opposing sides thereof. Dispose between the first and second liners 156*a*, 156*b* are first and second fluted layers 158*a*, 158*b*. The first fluted layer 156*a* is attached to the first liner 156*a* and the second fluted layer 156*b* is attached to the second liner 156*b* (e.g., at outwardly facing peaks thereof). Additionally, the first and second fluted layers 156*a*, 156*b* are attached to one another. The first and second fluted layers 156*a*, 156*b* include alternating peaks and valleys. The peaks of one fluted layer mate with the valleys of the other fluted layer and vice versa. The first and second fluted layers 156*a*, 156*b* may be attached to one another along the entire or portions of the lengths thereof. For instance, the first and second fluted layers 156*a*, 156*b* may be attached to one another at the mating peaks and valleys or along the entire lengths thereof.

Notably, the strength of the dual fluted corrugate board 160 is significantly higher than a typical single wall corrugated board. The strength of corrugate boards is measured using the Edge Crush Test ("ECT"). A typical single wall corrugated board has an ECT value of about 32. In contrast, a dual fluted corrugate board as described herein has an ECT value of about 52. In other words, the extra fluting layer in the dual fluted corrugate board increases the strength/ECT value by about 62%.

If such an increase in strength is not needed, a dual fluted corrugate board can be made that has similar strength/ECT value as a typical single wall corrugated board. To form such a dual fluted corrugated board, less sheet material is required. For instance, thinner sheet material may be used or the profile of the fluted layers may be changed (e.g., by making the peaks and valleys wider and/or shorter) to reduce the amount of sheet material used. As will be appreciated, using less material while providing the same or higher strength/ECT values is highly desirable.

In some embodiments, dual fluted corrugate boards as disclosed herein may provide similar strength/ECT values as common double wall corrugated boards. For instance, double wall corrugated boards typically have an ECT value of about 48. As noted above, a dual fluted corrugated board as described herein has an ECT value of about 52. Thus, the ECT value of the dual fluted corrugated boards disclosed herein is about 8% higher than a typical double wall corrugate board. This is particularly notable since the dual fluted corrugate boards require one less layer of sheet material to make compared to the double wall corrugated boards.

Figure 3B:
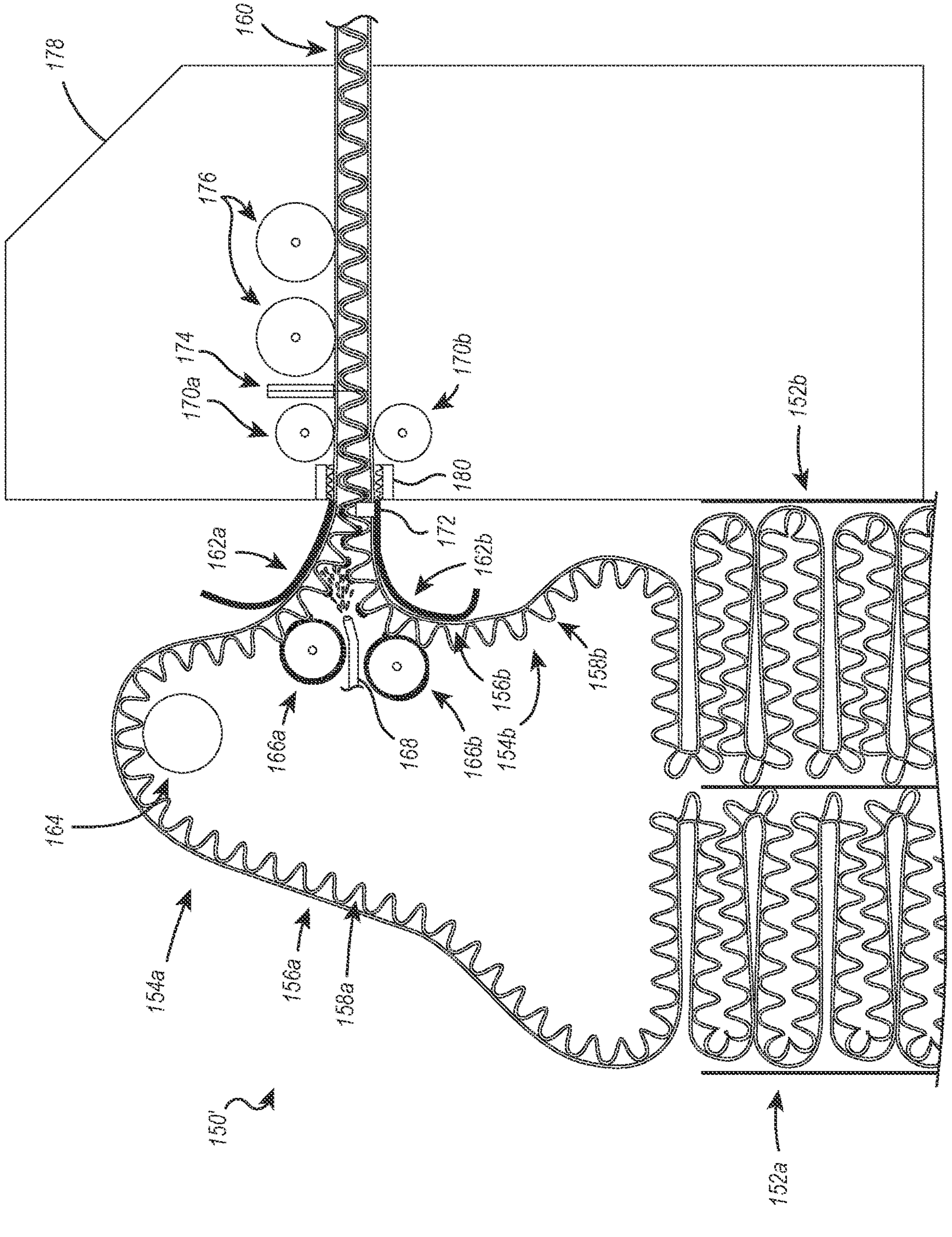
FIG. 3B illustrates another example system for forming dual fluted corrugated boards using ultrasound.

While the disclosed embodiments have focused on the formation of dual fluted corrugate boards, it will be appreciated that the disclosure is not limited to forming dual fluted corrugate boards. For instance, the disclosed embodiments may similarly be used to form single face, single wall, double wall, or triple wall corrugate boards. For instance, to form a single face corrugate board, the two sources of material (single face corrugate boards 154*a*, 154*b*) in FIGS. 3A and 3B may be replaced by a source of liner material and a source of fluted material that can be joined together in a manner similar to that described above to form a single face corrugate board. Similar, to form a single wall corrugate board, one of the two sources of material (single face corrugate boards 154*a*, 154*b*) in FIGS. 3A and 3B may be replaced with a source of liner material (without the attached fluted layer). The remaining single face corrugate board and the liner material may be joined together as described herein to form a single wall corrugate board.

According to one example embodiment, a system for producing dual fluted corrugated boards includes a first supply of single face corrugated board having a liner layer and a fluted layer attached to the liner layer, the fluted layer comprising a plurality of peaks and valleys; a second supply of single face corrugated board having a liner layer and a fluted layer attached to the liner layer, the fluted layer comprising a plurality of peaks and valleys; first and second merger guides configured to guide the single face corrugated boards of the first and second supplies, respectively, into engagement with one another, such that the peaks of the first supply nest within the valleys of the second supply and the peaks of the second supply next within the valleys of the first supply; and a sensor to detect proper engagement and nesting of the single face corrugated boards of the first and second supplies with one another.

In some embodiments, the system includes an ultrasonic device configured to apply pressure and ultrasonic vibrations to one or both of the single face corrugated boards of the first and second supplies to bond together the single face corrugated boards of the first and second supplies.

In some embodiments, the system includes a feed wheel configured to guide the single face corrugate board of the first supply to the first merger guide and maintain a separation between the single face corrugated boards of the first and second supplies.

In some embodiments, the system includes first and second feed wheels configured to engage and advance the single face corrugate boards of the first and second supplies, respectively.

In some embodiments, the first and second feed wheels are configured to selectively advance the single face corrugate boards of the first and second supplies, respectively, at different rates or at the same rate.

In some embodiments, the system includes an adhesive applicator configured to apply water, glue, or another adhesive to the fluted layer of the first supply and/or the fluted layer of the second supply.

In one embodiment, a system for producing dual fluted corrugated boards includes a first supply of single face corrugated board having a liner layer and a fluted layer attached to the liner layer, the fluted layer comprising a plurality of peaks and valleys; a second supply of single face corrugated board having a liner layer and a fluted layer attached to the liner layer, the fluted layer comprising a plurality of peaks and valleys; an adhesive applicator configured to apply water, glue, or an adhesive to the fluted layer of the first supply and/or the fluted layer of the second supply; first and second merger guides configured to guide the single face corrugated boards of the first and second supplies, respectively, into engagement with one another, such that the peaks of the first supply nest within the valleys of the second supply and the peaks of the second supply next within the valleys of the first supply; and an ultrasonic device configured to apply ultrasonic vibrations to one or both of the single face corrugated boards of the first and second supplies, the ultrasonic vibrations being configured to activate, heat, and/or dry the water, glue, or adhesive and/or cause fibers of the single face corrugated boards to weave, intertwine, or otherwise stick together.

In some embodiments, the system includes a sensor to detect proper engagement and nesting of the single face corrugated boards of the first and second supplies with one another.

In some embodiments, the system includes a feed wheel configured to guide the single face corrugate board of the first supply to the first merger guide and maintain a separation between the single face corrugated boards of the first and second supplies.

In some embodiments, the adhesive applicator comprises a glue wheel or a nozzle.

In some embodiments, the system also includes first and second feed wheels configured to engage and advance the single face corrugate boards of the first and second supplies, respectively, wherein the first and second feed wheels are configured to: selectively advance the single face corrugate boards of the first and second supplies, respectively, at different rates or at the same rate; or press the single face corrugate boards of the first and second supplies together to facilitate attachment therebetween.

In one embodiment, a method for making a dual fluted corrugated board includes providing a first single face corrugated board having a liner layer and a fluted layer attached to the liner layer; providing a second single face corrugated board having a liner layer and a fluted layer attached to the liner layer; arranging the first single face corrugated board and the second single face corrugated board such that the fluted layers thereof face one another; and attaching the fluted layer of the first single face corrugated board to the fluted layer of the second single face corrugated board.

In some embodiments, attaching the fluted layer of the first single face corrugated board to the fluted layer of the second single face corrugated board comprises applying ultrasonic vibrations to one or both of the first and second single face corrugated boards.

In some embodiments, the fluted layer of the first single face corrugated board comprises a plurality of peaks and valleys facing the fluted layer of the second single face corrugated board; and the fluted layer of the second single face corrugated board comprises a plurality of peaks and valleys facing the fluted layer of the first single face corrugated board, and the method further comprises: aligning the peaks in the fluted layer of the first single face corrugated board with the valleys in the fluted layer of the second single face corrugated board; and aligning the valleys in the fluted layer of the first single face corrugated board with the peaks in the fluted layer of the second single face corrugated board.

In some embodiments, the alignment further comprises moving one of the first single face corrugated board or the second single face corrugated board relative to the other.

In some embodiments, moving one of the first single face corrugated board or the second single face corrugated board relative to the other comprised moving one of the first single face corrugated board or the second single face corrugated board faster than the other.

In some embodiments, the method nesting the peaks in the fluted layer of the first single face corrugated board in the valleys of the fluted layer of the second single face corrugated board; and nesting the peaks in the fluted layer of the second single face corrugated board in the valleys of the fluted layer of the first single face corrugated board.

In some embodiments, attaching the first single face corrugated board to the second single face corrugated board comprises attaching the fluted layer of the first single face corrugated board to the fluted layer of the second single face corrugated board.

In some embodiments, attaching the first single face corrugated board to the second single face corrugated board comprises applying water, glue, or adhesive to the fluted layer of the first single face corrugated board and/or the fluted layer of the second single face corrugated board.

In some embodiments, attaching the first single face corrugated board to the second single face corrugated board further comprises applying ultrasonic vibrations to the first single face corrugated board and/or the second single face corrugated board to activate, heat, and/or dry the water, glue, or adhesive, and/or cause fibers thereof to weave, intertwine, or otherwise stick to one another.

In some embodiments, the method includes the first single face corrugated board and the second single face corrugated board together.

In some embodiments, attaching the first single face corrugated board to the second single face corrugated board comprises applying pressure and ultrasonic vibrations to the first single face corrugated board and/or the second single face corrugated board to bond together the first single face corrugated board and the second single face corrugated board.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for producing dual fluted corrugated boards, the system comprising:

- a first supply of single face corrugated board having a liner layer and a fluted layer attached to the liner layer, the fluted layer comprising a plurality of peaks and valleys;
- a second supply of single face corrugated board having a liner layer and a fluted layer attached to the liner layer, the fluted layer comprising a plurality of peaks and valleys;
- first and second merger guides configured to guide the single face corrugated boards of the first and second supplies, respectively, into engagement with one another, such that the peaks of the first supply nest within the valleys of the second supply and the peaks of the second supply nest within the valleys of the first supply, the first and second merger guides having infeed and outfeed ends; and
- a sensor positioned downstream of the first and second merger guides, the sensor being configured to detect whether the peaks and valleys of the single face corrugated boards have properly engaged and nested with one another.

2. The system of claim 1, further comprising an ultrasonic device configured to apply pressure and ultrasonic vibrations to one or both of the single face corrugated boards of the first and second supplies to bond together the single face corrugated boards of the first and second supplies, the ultrasonic device being positioned downstream from the first and second merger guides and the sensor.

3. The system of claim 1, further comprising a feed wheel configured to guide the single face corrugate board of the first supply to the first merger guide and maintain a separation between the single face corrugated boards of the first and second supplies.

4. The system of claim 1, further comprising first and second feed wheels positioned downstream from the first and second merger guides, the first and second feed wheels being configured to engage and advance the single face corrugate boards of the first and second supplies, respectively.

5. The system of claim 4, wherein the first and second feed wheels are configured to selectively advance the single face corrugate boards of the first and second supplies, respectively, at different rates or at the same rate.

6. The system of claim 1, further comprising an adhesive applicator configured to apply water, glue, or another adhesive to the fluted layer of the first supply and/or the fluted layer of the second supply.

7. A system for producing dual fluted corrugated boards, the system comprising:

- a first supply of single face corrugated board having a liner layer and a fluted layer attached to the liner layer, the fluted layer comprising a plurality of peaks and valleys;
- a second supply of single face corrugated board having a liner layer and a fluted layer attached to the liner layer, the fluted layer comprising a plurality of peaks and valleys;
- an adhesive applicator configured to apply water, glue, or an adhesive to the fluted layer of the first supply and/or the fluted layer of the second supply;
- first and second merger guides configured to guide the single face corrugated boards of the first and second supplies, respectively, into engagement with one another, such that the peaks of the first supply nest within the valleys of the second supply and the peaks of the second supply nest within the valleys of the first supply;
- a sensor positioned downstream of the first and second merger guides, the sensor being configured to detect whether the peaks and valleys of the single face corrugated boards have properly engaged and nested with one another;
- an ultrasonic device positioned downstream of the first and second merger guides, the ultrasonic device being configured to apply ultrasonic vibrations to one or both of the single face corrugated boards of the first and second supplies, the ultrasonic vibrations being configured to activate, heat, and/or dry the water, glue, or adhesive and/or cause fibers of the single face corrugated boards to weave, intertwine, or otherwise stick together; and
- first and second feed wheels configured to engage and advance the single face corrugate boards of the first and second supplies, respectively, the first and second feed wheels being positioned downstream of the first and second merger guides and one or both of the sensor or the ultrasonic device.

8. The system of claim 7, further comprising a feed wheel configured to guide the single face corrugate board of the first supply to the first merger guide and maintain a separation between the single face corrugated boards of the first and second supplies.

9. The system of claim 7, wherein the adhesive applicator comprises a glue wheel or a nozzle.

10. The system of claim 7, wherein the first and second feed wheels are configured to:

selectively advance the single face corrugate boards of the first and second supplies, respectively, at different rates or at the same rate; or press the single face corrugate boards of the first and second supplies together to facilitate attachment therebetween.

11. A system for producing dual fluted corrugated boards, the system comprising:

a first merger guide configured to guide a first single face corrugated board from a first supply;

a second merger guide configured to guide a second single face corrugated board from a second supply, the first and second merger guides being configured to guide the first and second single face corrugated boards into engagement with one another such that peaks of the first single face corrugated board nest within the valleys of the second single face corrugated board and the peaks of the second single face corrugated board nest within the valleys of the first single face corrugated board to form a dual fluted corrugated board; and a sensor positioned downstream the first and second merger guides and to a lateral side of the dual fluted corrugated board, the sensor being positioned and configured to see the peaks and valleys of the first and second single face corrugated boards to detect proper engagement and nesting of the peaks and valleys of the first and second single face corrugated boards.

12. The system of claim 11, further comprising an ultrasonic device configured to apply pressure and ultrasonic vibrations to one or both of the single face corrugated boards of the first and second supplies to bond together the single face corrugated boards of the first and second supplies, the ultrasonic device being positioned downstream of the sensor.

13. The system of claim 11, further comprising a feed wheel configured to guide the single face corrugate board of the first supply to the first merger guide and maintain a separation between the single face corrugated boards of the first and second supplies.

14. The system of claim 11, further comprising first and second feed wheels configured to engage and advance the single face corrugate boards of the first and second supplies, respectively, the first and second feed wheels being positioned downstream of the first and second merger guides.

15. The system of claim 14, wherein the first and second feed wheels are configured to selectively advance the single face corrugate boards of the first and second supplies, respectively, at different rates or at the same rate.

16. The system of claim 11, further comprising an adhesive applicator configured to apply water, glue, or another adhesive to the fluted layer of the first supply and/or the fluted layer of the second supply.

* * * * *